United States Patent
Ratnam

(10) Patent No.: US 12,197,910 B2
(45) Date of Patent: Jan. 14, 2025

(54) SYSTEMS AND METHODS FOR AUTOMATICALLY MANAGING SOFTWARE FOR AIRCRAFT

(71) Applicant: THE BOEING COMPANY, Chicago, IL (US)

(72) Inventor: Thevan Nakha Ratnam, Camberley (GB)

(73) Assignee: The Boeing Company, Chicago, IL (US)

(*) Notice: Subject to any disclaimer, the term of this patent is extended or adjusted under 35 U.S.C. 154(b) by 118 days.

(21) Appl. No.: 17/968,926

(22) Filed: Oct. 19, 2022

(65) Prior Publication Data

US 2024/0134633 A1  Apr. 25, 2024
US 2024/0231805 A9  Jul. 11, 2024

(51) Int. Cl.
*G06F 8/71* (2018.01)
*B64D 43/00* (2006.01)

(52) U.S. Cl.
CPC ............... *G06F 8/71* (2013.01); *B64D 43/00* (2013.01)

(58) Field of Classification Search
CPC .................................. G06F 8/71; B64D 43/00
USPC ................................................. 717/168–175
See application file for complete search history.

(56) References Cited

U.S. PATENT DOCUMENTS

| | | | |
|---|---|---|---|
| 6,671,589 B2 * | 12/2003 | Holst | H04B 7/18506 244/1 R |
| 8,615,384 B2 * | 12/2013 | Angus | H04L 67/12 703/2 |
| 8,793,677 B2 * | 7/2014 | Harada | G06F 1/32 713/321 |
| 8,806,579 B1 * | 8/2014 | Angus | G06F 9/5061 726/4 |
| 9,075,681 B2 * | 7/2015 | Frayssignes | G06Q 30/016 |
| 9,239,247 B1 * | 1/2016 | Angus | G06Q 10/20 |
| 10,663,930 B2 * | 5/2020 | Becker | H04L 12/40176 |
| 10,848,939 B1 * | 11/2020 | Panergo | H04W 4/024 |
| 11,150,885 B2 * | 10/2021 | Daum | G06F 8/65 |
| 12,077,313 B1 * | 9/2024 | Whaley | G09B 19/165 |
| 2017/0168810 A1 * | 6/2017 | Knijnenburg | G06F 8/65 |
| 2019/0384587 A1 * | 12/2019 | Rao | G06F 21/572 |

OTHER PUBLICATIONS

Gallagher et al., "Automatically Testing Interacting Software Components", ACM, pp. 57-63 (Year: 2006).*
Rushby, "New Challenges in Certification for Aircraft Software", ACM, pp. 211-218 (Year: 2011).*
Halle et al., "Next Generation IMA Configuration Engineering—From Architecture to Application", IEEE, pp. 1-13 (Year: 2015).*

(Continued)

*Primary Examiner* — Anil Khatri
(74) *Attorney, Agent, or Firm* — Joseph M. Butscher; The Small Patent Law Group LLC

(57) ABSTRACT

A system and a method include a software management control unit configured to receive one or more changes to one or more portions of a first software configuration for hardware components of one or more vehicle, such as aircraft, or other assets. The software management control unit is further configured to revise the first software configuration for the hardware components of the one or more aircraft to provide a second software configuration that includes the one or more changes.

20 Claims, 3 Drawing Sheets

(56) References Cited

OTHER PUBLICATIONS

Conradi et al., "Version Models for Software Configuration Management", ACM, pp. 1-51 (Year: 1998).*
Banks et al., "Configuration Management System Data Management Framework", ACM, pp. 699-703 (Year: 1991).*
Ding et al., "Research on Model Based Aircraft Flight Test SoS Engineering", ACM, pp. 170-179 (Year: 2023).*

* cited by examiner

SYSTEMS AND METHODS FOR AUTOMATICALLY MANAGING SOFTWARE FOR AIRCRAFT

FIELD OF THE DISCLOSURE

Examples of the subject disclosure generally relate to systems and methods for automatically managing software configurations for vehicles, such as aircraft, or other assets.

BACKGROUND OF THE DISCLOSURE

Aircraft are used to transport passengers and cargo between various locations. Numerous aircraft depart from and arrive at a typical airport every day.

Modern aircraft typically include various computing devices that operate various functions of the aircraft. Such computing devices include numerous pieces of hardware that operate according to software stored in memory thereof. Known aircraft include thousands of loadable software aircraft parts (LSAPs) that are configured to operate various hardware components of the aircraft. Such software can be revised and updated after an aircraft is manufactured. That is, when an aircraft is manufactured and delivered, the aircraft has an initial configuration for the various LSAPs that operate the various hardware components of the aircraft. Over time, such LSAPs can be revised and updated. As an example, a known aircraft has more than one thousand LSAPs, each of which can change over time due to modifications and upgrades.

Typically, an operator of the aircraft is responsible for tracking changes to the various LSAPs. In particular, as an LSAP is changed, an individual making the change typically must manually record the change, and allow the operator to track the change. Otherwise, when a piece of hardware running the LSAP is replaced (such as during a maintenance procedure), the hardware can run according to an outdated LSAP, such as was part of the original configuration.

As can be appreciated, manually tracking and recording changes to thousands of LSAPs can be subject to human error. For example, an individual may forget to track such one or more of the changes. Moreover, such a process can be time and labor intensive, and can even be overwhelming.

SUMMARY OF THE DISCLOSURE

A need exists for a system and a method for automatically managing and tracking changes to software of aircraft. Further, a need exists for a system and a method for effectively and efficiently managing software of aircraft.

With those needs in mind, certain examples of the subject disclosure provide a system including a software management control unit configured to receive one or more changes to one or more portions of a first software configuration for hardware components of one or more aircraft, and revise the first software configuration for the hardware components of the one or more aircraft to provide a second software configuration that includes the one or more changes. In at least one example, the system maintains a history of every change up to the most recent approved change.

In at least one example, the software management control unit is further configured to determine if the one or more changes are authorized in relation to an authorized software configuration. In at least one further example, the software management control unit is further configured to reject the one or more changes in response to determining that the one or more changes are not authorized in relation to the authorized software configuration. In at least one further example, the software management control unit is further configured to refrain from revising the first software configuration in response to rejecting the one or more changes.

In at least one example, the first software configuration includes all software for all the hardware components of the one or more aircraft. In at least one example, the first software configuration includes loadable software aircraft parts. In at least one example, the one or more portions of the first software configuration include one or more loadable software aircraft parts.

In at least one example, the first software configuration is an initial software configuration for the one or more aircraft as manufactured, and/or the last known configuration before induction, such as in the case of an aircraft operated by a previous owner.

In at least one example, the system also includes a user interface in communication with the software management control unit. The user interface includes a display. The software management control unit is further configured to prompt responses from an individual via the user interface. The software management control unit is further configured to show the first software configuration and the second software configuration on the display of the user interface.

In at least one example, the software management control unit is further in communication with a management and engineering system. The software management control unit is further configured to communicate the second software configuration (and optionally subsequently approved configuration changes) to the management and engineering system.

Certain examples of the present disclosure provide a method including receiving, by a software management control unit, one or more changes to one or more portions of a first software configuration for hardware components of one or more aircraft; and revising, by the software management control unit, the first software configuration for the hardware components of the one or more aircraft to provide a second software configuration that includes the one or more changes.

Certain examples of the present disclosure provide a non-transitory computer-readable storage medium comprising executable instructions that, in response to execution, cause one or more control units comprising a processor, to perform operations comprising: receiving one or more changes to one or more portions of a first software configuration for hardware components of one or more aircraft; and revising the first software configuration for the hardware components of the one or more aircraft to provide a second software configuration that includes the one or more changes.

DETAILED DESCRIPTION OF THE DISCLOSURE

Figure 1:
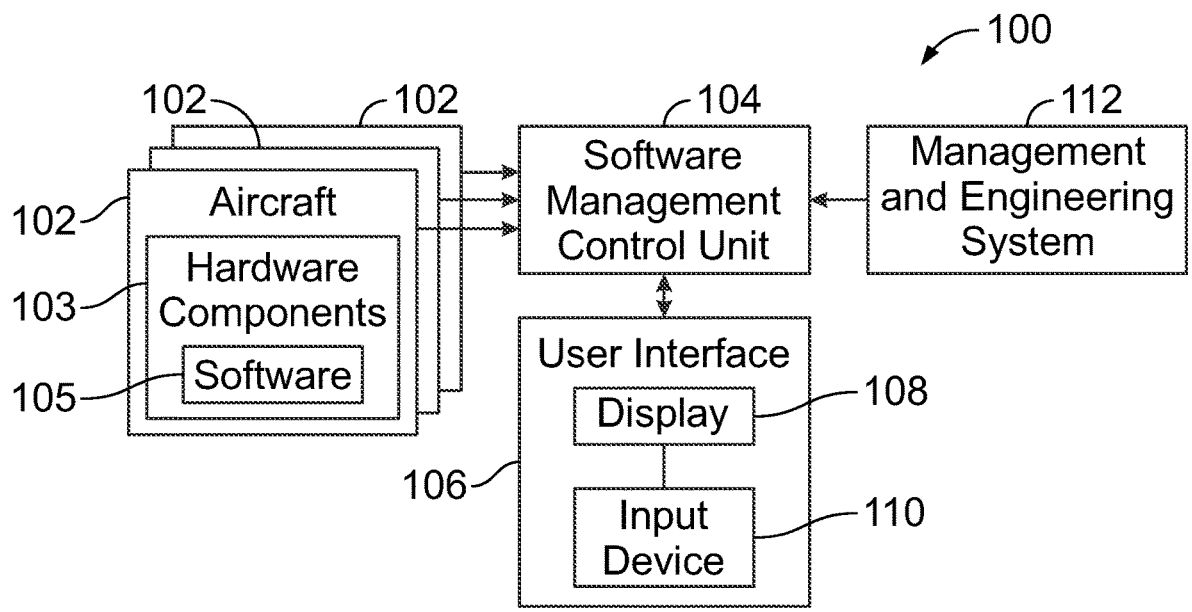
FIG. 1 illustrates a schematic block diagram for a system for managing software for one or more aircraft, according to an example of the subject disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Certain examples of the subject disclosure provide a self-updating system and method for automatically tracking a loadable software aircraft part (LSAP) configuration after an aircraft is delivered to customer. In at least one example, the LSAP configuration includes all loadable software aircraft parts (LSAPs) for all hardware of one or more aircraft. Part modifications are defined by specifying hardware to software relationships that are then validated in accordance with aircraft data. On receiving manufacturing and engineering information (such as from a manufacturing and engineering system that tracks manufacturing, engineering, maintenance and other information for one or more aircraft), LSAP changes can be determined and a baseline configuration can be updated in real time. The up-to-date baseline configuration can be used to provide accurate information to a mechanic when updating LSAPs. The baseline configuration can be compared with actual aircraft configuration to generate a mismatch report for compliance check. In addition, the baseline configuration can be used to facilitate additional data analytics and product improvements.

In at least one example, the systems and methods monitor an LSAP configuration after an aircraft is delivered to automatically manage and track post-delivery configuration changes, such as due to service bulletins and customer originated changes. The systems and methods can be used with respect to one or more vehicles, such as aircraft (for example, commercial and/or military aircraft) that are currently in service, or various other assets. The systems and methods described herein identifies software and changes thereto for hardware of aircraft instantly with zero ambiguity (for example, identify an authorized configuration), which can then be used by engineering and/or maintenance technicians. Further, the systems and methods described herein provide an easy route to demonstrating compliance relating to configuration control requirements. Additionally, the systems and methods described herein allow for tail-by-tail configuration management for aircraft within a fleet with notifications to maintenance and engineering personnel. The systems and methods can compare an authorized configuration with an actual configuration for an aircraft to ensure they match (for example, a quality check). Any mismatch can prompt an alert to drive a corrective action.

FIG. 1 illustrates a schematic block diagram for a system 100 for managing software for one or more aircraft 102, according to an example of the subject disclosure. As shown, the system 100 can be used to manage the software for numerous aircraft 102, such as an entire fleet of aircraft 102. As another example, the system 100 can be used to manage the software for a single aircraft 102. The aircraft 102 can be commercial aircraft or military aircraft, for example. The system 100 can be used to manage software for vehicles, such as the aircraft 102, or various other engineered assets, such as military defense systems, residential or commercial building systems, and/or the like.

Each aircraft includes one or more hardware components (for example, components, individual pieces, or the like of hardware, or simply hardware, in general) 103. Each of the hardware components 103 operates according to software 105, such as can be stored in memory of the hardware components 103. Examples of hardware components 103 includes computers, computer or electronic modules, engines, air conditioning and ventilation units, and/or the like. Each of the hardware components 103 can include any number of components of software 105. For example, a general processing module can operate according to twenty or more components of software 105. As another example, an audio control system can operate according to ten or less components of software 105. An LSAP is an example of software 105.

The system 100 includes a software management control unit 104 in communication with a user interface 106, such as through one or more wired or wireless connections, web- or cloud-based connections, a private communication network, and/or the like. In at least one example, the software management control unit 104 and the user interface 106 are co-located. For example, the software management control unit 104 and the user interface 106 can be part of a computing device or system. As another example, the software management control unit 104 and the user interface 106 can be remotely located from one another. In at least one alternative example, the user interface 106 can be onboard an aircraft 102, such as part of a flight computer. As another alternative example, the software management control unit 104 can be onboard an aircraft 102.

The user interface 106 includes a display 108 and an input device 110, both of which can be in communication with the software management control unit 104, such as through one or more wired or wireless connections, web- or cloud-based connections, a private communication network, and/or the like. The display 108 can be a monitor, screen, television, touchscreen, and/or the like. The input device 110 can include a keyboard, mouse, stylus, touchscreen interface (that is, the input device 110 can be integral with the display 108), and/or the like.

In at least one alternative example, the aircraft 102 includes a user interface 106. For example, a user interface 106 can be in communication with and/or form a part of a flight computer of the aircraft 102. As another example, the user interface 106 can be part of a separate computer workstation aboard the aircraft 102. As another example, the user interface 106 can be a handheld device, such as a smart phone, tablet, or the like, within or outside of the aircraft 102. Optionally, the user interface 106 can be located remotely from the aircraft 102, such as at an air traffic control location, a ground control location, a maintenance center, and/or the like.

As described herein, the software management control unit 104 is configured to prompt responses from an individual via the user interface 106. The software management control unit 104 is configured to show software configurations (such as a first software configuration and a second software configuration) for the aircraft 102 configuration on the display 108 of the user interface 106.

The software management control unit 104 receives a data feed from a management and engineering system 112, such as through one or more wired or wireless connections, web- or cloud-based connections, a private communication network, and/or the like. The software management control unit 104 and the management and engineering system 112 can be co-located, or remotely located from one another. The management and engineering system 112 includes one or more control units that are configured to manage the various aspects of the aircraft 102. The management and engineering system 112 can also be in communication with the aircraft 102, such as through one or more wired or wireless connections, web- or cloud-based connections, a private communication network, and/or the like.

As described herein, the software management control unit 104 is configured to receive a modified software configuration from the management and engineering system 112. In this manner, the software management control unit 104 can always maintain or otherwise have an up-to-date software configuration for the aircraft 102, thereby ensuring that out-of-date software is not used with respect to hardware components 103 of the aircraft 102. In at least one example, the software management control unit 104 can retain a first configuration and/or other prior configurations in memory for historical and/or future reference purposes.

The aircraft 102 are manufactured and delivered having an initial software configuration for all LSAPs that operate the various hardware of the aircraft. One or more LSAPs can be changed, thereby modifying the initial software configuration to a modified software configuration that includes one or more LSAPs. The software management control unit 104 monitors and tracks the modifications of the LSAPs.

Figure 2:
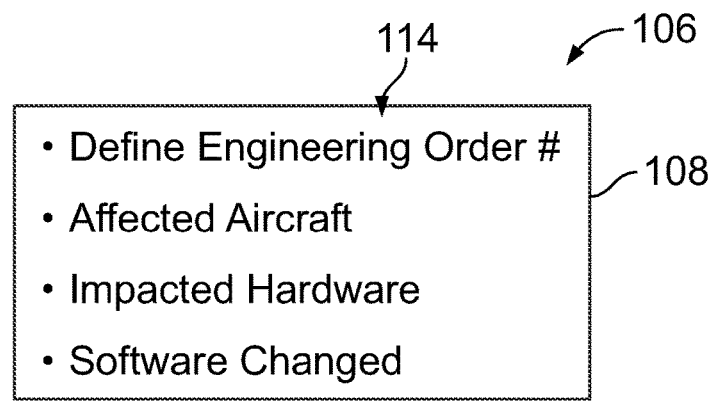
FIG. 2 illustrates a front view of a display of a user interface showing prompts regarding a software modification, according to an example of the subject disclosure.

FIG. 2 illustrates a front view of the display 108 of the user interface 106 showing prompts regarding a software modification, according to an example of the subject disclosure. Referring to FIGS. 1 and 2, when a modification to the software is to be made, an individual first engages the software management control unit 104, such as via an initial engagement indicating a modification to the software is to be made. In response, the software management control unit 104 operates to show an initial prompt screen 114, which includes various prompts, such as requesting an individual to define a particular engineering order, which aircraft 102 are affected, which hardware of the aircraft 102 are affected, and which software of the affected hardware are changed.

For example, using the user interface 106, an individual can first identify which aircraft 102 a software modification is to apply. Next, the individual can identify which components of hardware that use the software that is to be modified. For example, an aircraft 102 includes hardware, such as numerous general processing modules (GPMs). Each GPM operates according to various software components, such as numerous LSAPs. Via the user interface 106, the individual can identify which LSAPs of a GPM are to be modified. Other examples of hardware that operate according to LSAPs include controllers, control panels, climate control systems, and the like.

Figure 3:
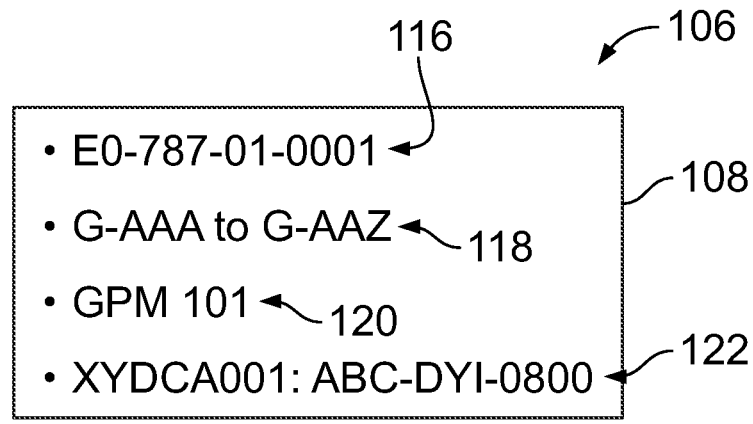
FIG. 3 illustrates a front view of the display of the user interface showing the software modification, according to an example of the subject disclosure.

FIG. 3 illustrates a front view of the display 108 of the user interface 106 showing the software modification, according to an example of the subject disclosure. Referring to FIGS. 1-3, after the individual inputs the various information prompted by the software management control unit 104 (as shown in FIG. 2), the software management control unit 104 can then show the engineering order number 116, the affected aircraft 118, the impacted hardware 120, and the affected software 122, including the change(s) thereto.

The management and engineering system 112 reports a software change that has been made, such as via a software change signal received by the software management control unit 104. The software change signal includes data including the engineering order number 116, and the affected aircraft 118, for example. The software management control unit 104 then compares such information in relation to stored software configuration for the various aircraft 102. The software management control unit 104 then automatically updates the stored software configuration for the aircraft 102 to include the various updates thereto, thereby providing a modified software configuration. The software management control unit 104 saves the modified software configuration, which includes any and all changes to the various LSAPs of the hardware, for the aircraft 102. In this manner, the software management control unit 104 automatically tracks, manages, and updates the changes to the software configuration for the aircraft 102, thereby ensuring that outdated software configurations are not used for the aircraft 102 (such as when one or more pieces of hardware for the aircraft 102 are replaced, changed, modified, and/or the like).

In at least one example, the modified software configuration of the aircraft 102 can be compared in relation to an authorized software configuration, which can be stored in a memory of (or in communicatively coupled to) the software management control unit 104. In this manner, changes to the software configuration can be immediately checked in relation to the authorized software configuration to ensure that the changes are in compliance with one or more regulations, engineering requirements, maintenance requirements, and/or the like.

As described herein, the system 100 includes the software management control unit 104, which is configured to receive one or more changes to one or more portions of a first software configuration for hardware components of one or more aircraft 102. The software management control unit 104 is further configured to revise the first software configuration for the hardware components of the one or more aircraft 102 to provide a second software configuration that includes the one or more changes. In at least one example, the software management control unit 104 is further configured to determine if the one or more changes are authorized in relation to an authorized software configuration. The software management control unit 104 is further configured to reject the one or more changes if the one or more changes are not authorized in relation to the authorized software configuration, and refrain from revising the first software configuration in response to the one or more changes being rejected.

Figure 4:
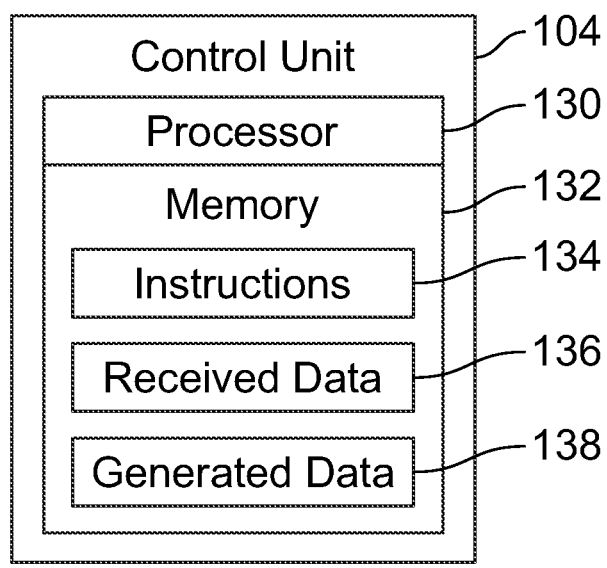
FIG. 4 illustrates a schematic block diagram of a software management control unit, according to an example of the subject disclosure.

FIG. 4 illustrates a schematic block diagram of the software management control unit 104, according to an example of the present disclosure. In at least one example, the software management control unit 104 includes at least one processor 130 in communication with a memory 132. The memory 132 stores instructions 134, received data 136, and generated data 138. The software management control unit 104 shown in FIG. 4 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the software management control unit 104 can be or include one or more processors that are configured to control operation, as described herein.

The software management control unit 104 is configured to execute a set of instructions that are stored in one or more data storage units or elements (such as one or more memories), in order to process data. For example, the software management control unit 104 can include or be coupled to one or more memories. The data storage units can also store data or other information as desired or needed. The data storage units can be in the form of an information source or a physical memory element within a processing machine.

The set of instructions may include various commands that instruct the software management control unit 104 as a processing machine to perform specific operations such as the methods and processes of the various examples of the subject matter described herein. The set of instructions can be in the form of a software program. The software can be in various forms such as system software or application software. Further, the software can be in the form of a collection of separate programs, a program subset within a larger program, or a portion of a program. The software can also include modular programming in the form of object-oriented programming. The processing of input data by the processing machine may be in response to user commands, or in response to results of previous processing, or in response to a request made by another processing machine.

The diagrams of examples herein illustrate one or more control or processing units, such as the software management control unit 104. It is to be understood that the processing or control units can represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware can include state machine circuitry hardwired to perform the functions described herein. Optionally, the hardware can include electronic circuits that include and/or are connected to one or more logic-based devices, such as microprocessors, processors, controllers, or the like. Optionally, the software management control unit 104 can represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms can include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 5:
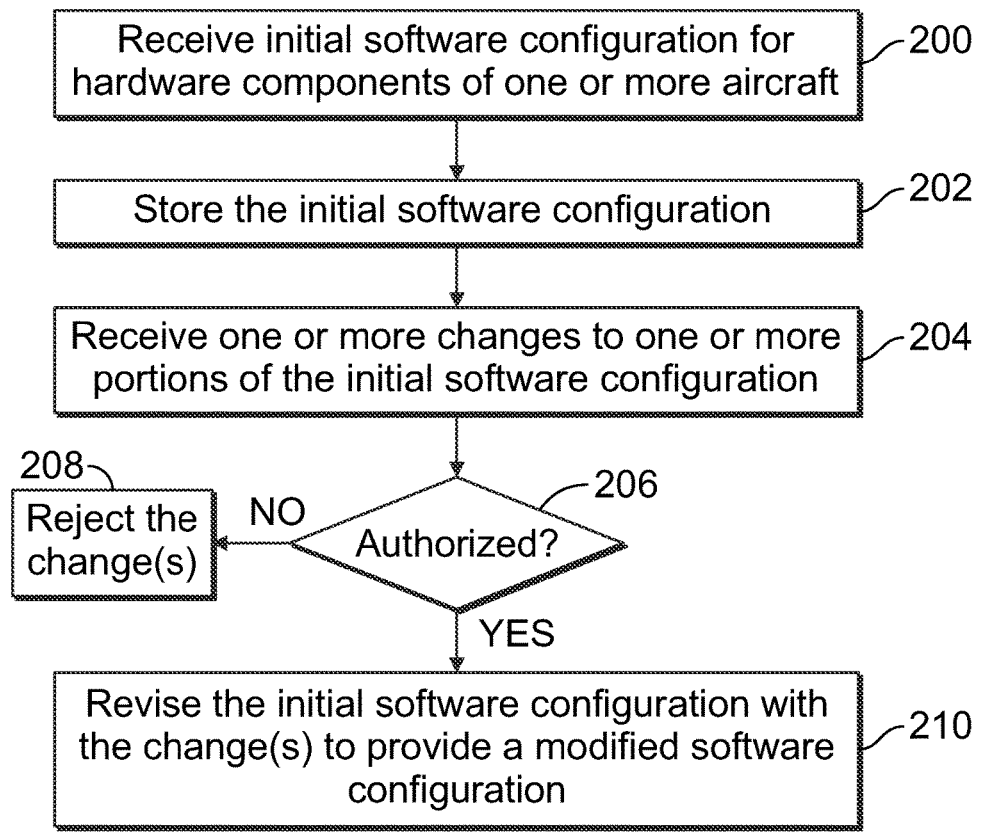
FIG. 5 illustrates a flow chart of a method for managing software for one or more aircraft, according to an example of the subject disclosure.

FIG. 5 illustrates a flow chart of a method for managing software for one or more aircraft, according to an example of the subject disclosure. Referring to FIGS. 1-5, at 200, initial software configuration for hardware components of one or more aircraft 102 are received, such as by the software management control unit 104. At 202, the initial software configuration is stored, such as in a memory of, or otherwise coupled to, the software management control unit 104. In at least one example, the initial software configuration includes the configuration for all software of all hardware of an aircraft 102 as originally manufactured and delivered to an owner of the aircraft 102, or an authorized configuration at the point of induction, such as in the case of an aircraft procured from a previous owner.

At 204, the software management control unit 104 receives one or more changes to one or more portions of the initial software configuration, such as input by an individual through the user interface 106. The one or more changes can include one or more changes to one or more LSAPs of one or more hardware components of the aircraft 102. At 206, the software management control unit 104 compares the change(s) in relation to an authorized software configuration to determine if such change(s) are authorized. If the change(s) is not authorized, the method proceeds from 206 to 208, at which the software management control unit 104 rejects the change(s), and can the output a rejection signal user interface 106, which can then show a message on the display that the change(s) is not authorized.

If, however, the change(s) is authorized at 206, the method proceeds to 210, at which the software management control unit 104 revises (that is, automatically revises without human intervention) the initial software configuration with the change(s) to provide a modified software configuration. The software management control unit 104 then stores the modified software configuration (which can replace the initial software configuration), thereby ensuring that outdated software is not used with affected hardware of the aircraft 102.

The process may repeat. For example, the modified software configuration can then be stored at step 202. Changes to the modified software configuration can then be analyzed by the software management control unit 104 and the modified software configuration can be further modified and stored. In this manner, the software management control unit 104 receives the one or more changes to the one or more portions of a first software configuration (such as an initial software configuration or a modified software configuration) and then revises the first software configuration to provide a second software configuration that includes one or more modifications to the first software configuration. As such, the software management control unit monitors changes to a software configuration, tracks such changes, and modifies the software configuration to reflect the changes thereto, thereby ensuring that outdated software is not used with respect to hardware components of an aircraft 102.

As described herein, the software management control unit 104 is configured to automatically update software configurations for the aircraft 102, whether a single aircraft 102, a fleet of aircraft 102, a subset of aircraft 102 within a fleet, or the like. In at least one example, the software management control unit 104 can be configured to interact with the user interface 106 and receive a data feed from the management and engineering system 112 via the web (for example, the systems and methods described herein can be web-based), and therefore may not require specific dedicated software to interact with the user interface 106 or process the data fee received from the management and engineering system 112.

As described herein, in at least one example, the software management control unit 104 is configured to load and store various software configurations, including an initial delivery software configuration (for example, an initial software configuration for a vehicle as manufactured and delivered to a customer). The software management control unit 104 is further configured to record proposed modifications to the software configuration. In at least one example, the proposed modifications include document number, aircraft, hosting hardware, embedded software that is changed, and/or the like. In at least one example, when assessing such proposed modifications and building a definition based on the proposed modifications, the software management control unit 104 also validates a hardware-to-software relationship based on defined vehicle tree data, for example.

In at least one example, the software management control unit 102 receives one or more LSAP changes via a data feed from the management and engineering system 112 (including document number, aircraft registration and time, and/or the like). The software management control unit 104 updates, in real-time, a software configuration (such as a delivery software configuration) to generate a baseline software configuration. The software management control unit 102 then uses the baseline software configuration to provide updated and accurate information to a user (such as a mechanic), for example, via a user interface 106, when queried.

In at least one example, the software management control unit 104 automatically compares the baseline software configuration with an actual vehicle software configuration to generate a mismatch report for a compliance check. The software management control unit 104 can then mismatch report to a user interface 106, such as one of a mechanic, aircraft operator, or the like. The mismatch report is shown on the display 108 of the user interface 106, for example. In at least one example, the software management control unit 104 can also provide, in real time, the baseline software configuration data back to an original equipment manufacturer (OEM) to facilitate additional data analytics and product improvements.

Referring to FIGS. 1-5, examples of the subject disclosure provide systems and methods that allow large amounts of data to be quickly and efficiently analyzed by a computing device. For example, the software management control unit 104 can analyze various aspects of software configurations and changes thereto for numerous aircraft 102. As such, large amounts of data, which may not be readily and easily discernable by human beings, are being tracked and analyzed. The vast amounts of data are efficiently organized and/or analyzed by the software management control unit 104, as described herein. The software management control unit 104 analyzes the data in a relatively short time in order to quickly and efficiently determine changes to software configurations, and update changes thereto in real time. A human being would be incapable of efficiently analyzing such vast amounts of data in such a short time. As such, examples of the subject disclosure provide increased and efficient functionality, and vastly superior performance in relation to a human being analyzing the vast amounts of data.

In at least one example, components of the system 100, such as the software management control unit 104, provide and/or enable a computer system to operate as a special computer system for determining, managing, tracking, and updating software configurations for various hardware components of aircraft 102. The software management control unit 104 improves upon standard computing devices by monitoring, tracking, and updating such software configurations for aircraft 102 in an efficient and effective manner.

In at least one example, all or part of the systems and methods described herein may be or otherwise include an artificial intelligence (AI) or machine-learning system that can automatically perform the operations of the methods also described herein. For example, the software management control unit 104 can be an artificial intelligence or machine learning system. These types of systems may be trained from outside information and/or self-trained to repeatedly improve the accuracy with how data is analyzed to monitor, track, and update software configurations for various aircraft 102. Over time, these systems can improve by monitoring, tracking, and updating the software configurations with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of up-to-date, current software configurations for various aircraft 102. The training minimizes conflicts and interference by performing an iterative training algorithm, in which the systems are retrained with an updated set of data (for example, data received before, during, and/or after changes to LSAPs) and based on the feedback examined prior to the most recent training of the systems. This provides a robust analysis model that can better determine current software configurations in a cost effective, efficient, and overall effective manner.

Figure 6:
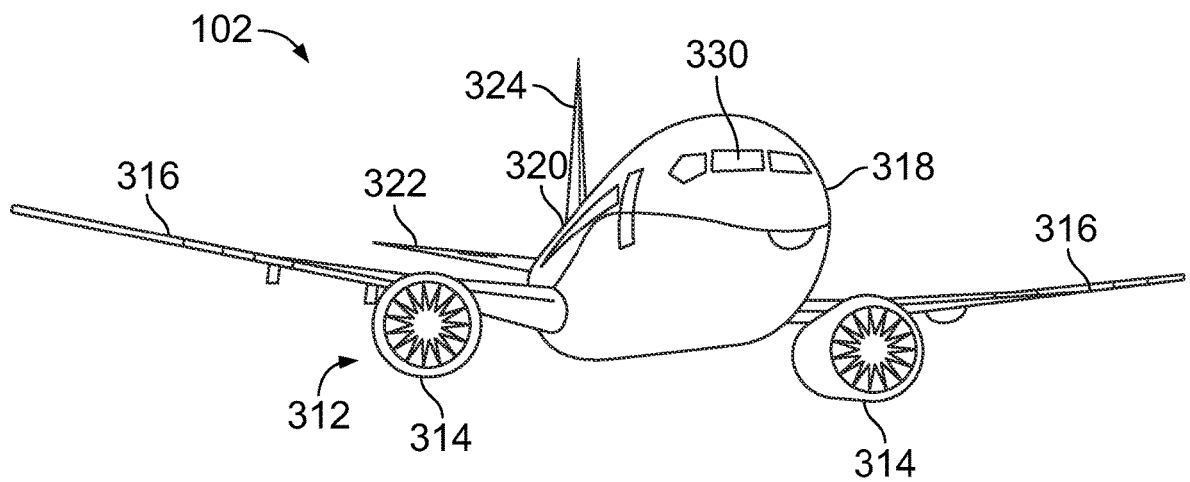
FIG. 6 illustrates a perspective front view of an aircraft, according to an example of the subject disclosure.

FIG. 6 illustrates a perspective front view of an aircraft 102, according to an example of the subject disclosure. The aircraft 102 includes a propulsion system 312 that includes engines 314, for example. Optionally, the propulsion system 312 may include more engines 314 than shown. The engines 314 are carried by wings 316 of the aircraft 102. In other examples, the engines 314 may be carried by a fuselage 318 and/or an empennage 320. The empennage 320 may also support horizontal stabilizers 322 and a vertical stabilizer 324. The fuselage 318 of the aircraft 102 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like. FIG. 6 shows an example of an aircraft 102. It is to be understood that the aircraft 102 can be sized, shaped, and configured differently than shown in FIG. 6.

Further, the disclosure comprises examples according to the following clauses:

Clause 1. A system comprising:
  a software management control unit configured to:
    receive one or more changes to one or more portions of a first software configuration for hardware components of one or more aircraft; and
    revise the first software configuration for the hardware components of the one or more aircraft to provide a second software configuration that includes the one or more changes.

Clause 2. The system of Clause 1, wherein the software management control unit is further configured to determine if the one or more changes are authorized in relation to an authorized software configuration.

Clause 3. The system of Clause 2, wherein the software management control unit is further configured to reject the one or more changes in response to determining that the one or more changes are not authorized in relation to the authorized software configuration.

Clause 4. The system of claim 3, wherein the software management control unit is further configured to refrain from revising the first software configuration in response to rejecting the one or more changes.

Clause 5. The system of any of Clauses 1-4, wherein the first software configuration comprises all software for all the hardware components of the one or more aircraft.

Clause 6. The system of any of Clauses 1-5, wherein the first software configuration comprises loadable software aircraft parts.

Clause 7. The system of any of Clauses 1-6, wherein the one or more portions of the first software configuration comprise one or more loadable software aircraft parts.

Clause 8. The system of any of Clauses 1-7, wherein the first software configuration is an initial software configuration for the one or more aircraft as manufactured.

Clause 9. The system of any of Clauses 1-8, further comprising a user interface in communication with the software management control unit, wherein the user interface comprises a display, wherein the software management control unit is further configured to prompt responses from an individual via the user interface, and wherein the software management control unit is further configured to show the first software configuration and the second software configuration on the display of the user interface.

Clause 10. The system of any of Clauses 1-9, wherein the software management control unit is further in communication with a management and engineering system, and wherein the software management control unit is further configured to communicate the second software configuration to the management and engineering system.

Clause 11. A method comprising:
receiving, by a software management control unit, one or more changes to one or more portions of a first software configuration for hardware components of one or more aircraft; and revising, by the software management control unit, the first software configuration for the hardware components of the one or more aircraft to provide a second software configuration that includes the one or more changes.

Clause 12. The method of Clause 11, further comprising:
determining, by the software management control unit, if the one or more changes are authorized in relation to an authorized software configuration;
rejecting, by the software management control unit, the one or more changes in response to determining that the one or more changes are not authorized in relation to the authorized software configuration; and
refraining, by the software management control unit, from revising the first software configuration in response to said rejecting.

Clause 13. The method of Clauses 11 or 12, wherein the first software configuration comprises all software for all the hardware components of the one or more aircraft.

Clause 14. The method of any of Clauses 11-13, wherein the first software configuration comprises loadable software aircraft parts.

Clause 15. The method of any of Clauses 11-14, wherein the one or more portions of the first software configuration comprise one or more loadable software aircraft parts.

Clause 16. The method of any of Clauses 11-15, wherein the first software configuration is an initial software configuration for the one or more aircraft as manufactured.

Clause 17. The method of any of Clauses 11-16, further comprising:
prompting, by the software management control unit, responses from an individual via a user interface that is in communication with the software management control unit; and
showing, by the software management control unit, the first software configuration and the second software configuration on a display of the user interface.

Clause 18. The method of any of Clauses 11-17, further comprising communicating, by the software management control unit, the second software configuration to a management and engineering system that is in communication with software management control unit.

Clause 19. A non-transitory computer-readable storage medium comprising executable instructions that, in response to execution, cause one or more control units comprising a processor, to perform operations comprising:
receiving one or more changes to one or more portions of a first software configuration for hardware components of one or more aircraft; and
revising the first software configuration for the hardware components of the one or more aircraft to provide a second software configuration that includes the one or more changes.

Clause 20. The non-transitory computer-readable storage medium of Clause 19, further comprising:
determining if the one or more changes are authorized in relation to an authorized software configuration;
rejecting the one or more changes in response to determining that the one or more changes are not authorized in relation to the authorized software configuration; and
refraining from revising the first software configuration in response to said rejecting.

As described herein, examples of the subject disclosure provide systems and methods for automatically managing and tracking changes to software of aircraft. Further, examples of the subject disclosure provide systems and methods for effectively and efficiently managing software of aircraft.

While various spatial and directional terms, such as top, bottom, lower, mid, lateral, horizontal, vertical, front and the like can be used to describe examples of the subject disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
   one or more aircraft including one or more hardware components, wherein the one or more hardware components operate according to software;
   a management and engineering system in communication with the one or more aircraft;
   a user interface comprising a display and an input device; and
   a software management control unit including one or more processors, wherein the software management control unit is in communication with the management and engineering system and the user interface, the software management control unit configured to:
      prompt responses from an individual via the user interface;
      receive one or more software change signals from the management and engineering system, wherein the one or more software change signals include data regarding one or more changes to one or more portions of a first software configuration for the one or more hardware components of the one or more aircraft;
      revise the first software configuration for the one or more hardware components of the one or more aircraft to provide a second software configuration that includes the one or more changes;
      refrain from revising the first software configuration in response to rejecting the one or more changes; and
      show the first software configuration and the second software configuration on the display of the user interface,
      wherein the one or more hardware components are operated according to the second software configuration.

2. The system of claim 1, wherein the software management control unit is further configured to determine if the one or more changes are authorized in relation to an authorized software configuration.

3. The system of claim 2, wherein the software management control unit is further configured to reject the one or more changes in response to determining that the one or more changes are not authorized in relation to the authorized software configuration.

4. The system of claim 1, wherein the first software configuration comprises all software for all the hardware components of the one or more aircraft.

5. The system of claim 1, wherein the first software configuration comprises loadable software aircraft parts.

6. The system of claim 1, wherein the one or more portions of the first software configuration comprise one or more loadable software aircraft parts.

7. The system of claim 1, wherein the first software configuration is an initial software configuration for the one or more aircraft as manufactured.

8. The system of claim 1, wherein the software management control unit is further configured to communicate the second software configuration to the management and engineering system.

9. The system of claim 1, wherein the software management control unit is further configured to retain the first software configuration in a memory.

10. The system of claim 1, wherein the software management control unit is further configured to show, on the display, one or more engineering order numbers, the one or more aircraft affected by the one or more engineering order numbers, the hardware components impacted by the one or more engineering order numbers, the first software configuration affected by the one or more engineering order numbers, and changes to the first software configuration.

11. A method for a system comprising:
   one or more aircraft including one or more hardware components, wherein the one or more hardware components operate according to software;
   a management and engineering system in communication with the one or more aircraft;
   a user interface comprising a display and an input device; and
   a software management control unit including one or more processors, wherein the software management control unit is in communication with the management and engineering system and the user interface, the software management control unit configured to:
      prompt responses from an individual via the user interface;
      receive one or more software change signals from the management and engineering system, wherein the one or more software change signals include data regarding one or more changes to one or more portions of a first software configuration for the one or more hardware components of the one or more aircraft;
      revise the first software configuration for the one or more hardware components of the one or more aircraft to provide a second software configuration that includes the one or more changes;
      show the first software configuration and the second software configuration on the display of the user interface, the method comprising:
prompting, by the software management control unit, responses from an individual via the user interface;
receiving, by a software management control unit, one or more software change signals from the management and engineering system,
wherein the one or more software change signals include data regarding one or more changes to one or more portions of a first software configuration for one or more hardware components of the one or more aircraft;
revising, by the software management control unit, the first software configuration for the one or more hardware components of the one or more aircraft to provide a second software configuration that includes the one or more changes;
showing the first software configuration and the second software configuration on the display of the user interface;
determining, by the software management control unit, if the one or more changes are authorized in relation to an authorized software configuration;
rejecting, by the software management control unit, the one or more changes in response to determining that the one or more changes are not authorized in relation to the authorized software configuration;
refraining, by the software management control unit, from revising the first software configuration in response to said rejecting; and
operating the one or more hardware components according to the second software configuration.

12. The method of claim 11, wherein the first software configuration comprises all software for all the hardware components of the one or more aircraft.

13. The method of claim 11, wherein the first software configuration comprises loadable software aircraft parts.

14. The method of claim 11, wherein the one or more portions of the first software configuration comprise one or more loadable software aircraft parts.

15. The method of claim 11, wherein the first software configuration is an initial software configuration for the one or more aircraft as manufactured.

16. The method of claim 11, further comprising communicating, by the software management control unit, the second software configuration to the management and engineering system.

17. A system comprising:
a plurality of aircraft, wherein each of the plurality of aircraft includes hardware components, wherein each of the hardware components operates according to software;
a management and engineering system in communication with the plurality of aircraft;
a user interface comprising a display and an input device; and
a software management control unit including one or more processors, wherein the software management control unit is in communication with the management and engineering system and the user interface through one or more wired or wireless connections, the software management control unit configured to:
prompt responses from an individual via the user interface;
receive software change signals from the management and engineering system, wherein software change signals include data regarding changes to one or more portions of a first software configuration for one or more of the hardware components of the plurality of aircraft;
revise the first software configuration for the one or more of the hardware components of the plurality of aircraft to provide a second software configuration that includes the one or more changes;
reject the one or more changes in response to determining that the one or more changes are not authorized in relation to the authorized software configuration;
refrain from revising the first software configuration in response to rejecting the one or more changes; and
show the first software configuration and the second software configuration on the display of the user interface,
wherein the one or more of the hardware components are operated according to the second software configuration.

18. The system of claim 17, wherein the software management control unit is further configured to determine if the one or more changes are authorized in relation to an authorized software configuration.

19. The system of claim 17, wherein the first software configuration comprises all software for all the hardware components of the one or more aircraft.

20. The system of claim 17, wherein the first software configuration comprises loadable software aircraft parts.

* * * * *